United States Patent [19]

Lane et al.

[11] Patent Number: 4,908,747

[45] Date of Patent: Mar. 13, 1990

[54] ADVANCED PROPORTIONAL PLUS INTEGRAL PLUS DERIVATIVE CONTROLLER

[75] Inventors: John D. Lane, McLean, Va.; Theodore N. Matsko, Chesterland; Joseph G. Patella, Mentor; Thomas J. Scheib, Chesterland, all of Ohio

[73] Assignee: The Babcock & Wilcox Company, New Orleans, La.

[21] Appl. No.: 170,509

[22] Filed: Mar. 21, 1988

[51] Int. Cl.⁴ .................... G05B 11/42; G06G 7/66
[52] U.S. Cl. ................................. 364/162; 364/157; 364/165
[58] Field of Search ................. 364/157, 161–163, 364/165; 318/610

[56] References Cited

U.S. PATENT DOCUMENTS

| | | | |
|---|---|---|---|
| 4,390,942 | 6/1983 | de Keizer | 364/162 |
| 4,556,956 | 12/1985 | Dickenson et al. | 364/162 |
| 4,630,187 | 12/1986 | Henze | 363/41 |
| 4,669,040 | 5/1987 | Pettit et al. | 364/162 |

Primary Examiner—Jerry Smith
Assistant Examiner—Paul Gordon
Attorney, Agent, or Firm—Vytas R. Matas; Robert J. Edwards

[57] ABSTRACT

A proportional plus integral plus differential (PID) controller containing an algorithm option is disclosed. The option allows the selection of a classical interacting type of controller or a non-interacting type of controller. The classical interacting type of controller is characterized by the property that tuning any one of the proportional, integral or derivative terms changes the effective value of the other terms. In contrast, the non-interacting type of controller is characterized by the property that tuning any one of the proportional, integral or derivative terms has no effect on the other terms.

9 Claims, 4 Drawing Sheets

ADVANCED PROPORTIONAL PLUS INTEGRAL PLUS DERIVATIVE CONTROLLER

TECHNICAL FIELD

The present invention pertains to proportional plus integral plus differential (PID) controllers in general and more particularly to PID controllers whose ability to produce a multiplicity of algorithms is not limited by the hardware utilized.

BACKGROUND ART

The general concept of proportional plus integral plus derivative (PID) control is well known in the art. This type of control, while originally used in time mechanisms and steam engine governors, was first described in a mathematical context early in the 20th century. Utilization of PID control led to further development of the concept resulting in the incorporation of PID controllers in a substantial majority of process control applications.

Evolution of the PID controller has led to a current abundance of variants of the basic algorithm. These variants have resulted from restrictions imposed by available hardware. Three principle forms of the PID algorithm are the parallel algorithm (equation 1), the non-interacting algorithm (equation 2), and the interacting algorithm (equation 3), shown below:

$$U(t) = k_c \left( e(t) + k_I \frac{e(t)}{S} + k_D S e(t) \right) \quad (1)$$

$$U(t) = k_p e(t) + k_I \frac{e(t)}{S} + k_D S e(t) \quad (2)$$

$$U(t) = k_c [k_p e(t) + k_D S e(t)] \left[ 1 + \frac{k_I}{S} \right] \quad (3)$$

where $U(t)$ = control signal calculated by PID at time $t$
$e(t)$ = error between process variable measurement and reference trajectory at time $t$
$k_c$ = overall controller gain (output units/error units)
$k_p$ = proportional gain (output units/error units)
$k_I$ = integral gain (output units/minutes − error units)
$k_D$ = derivative gain (output units − minutes/error units)
$S$ = Laplace operator Three variants of these basic PID algorithms exist. These algorithm variants can be either position or velocity type, the derivative can be calculated on an error signal or an actual measurement, and the derivative can be calculated directly or through the use of a lead lag.

Equations 1, 2 and 3, as shown above, are written in positional form. In corresponding velocity equations, the error signal is replaced with a change in the error signal and a change in control effort is calculated according to the standard equations 1, 2 and 3. This change in control effort is integrated over time to generate a control effort. In normal operating modes there is no performance difference between the positional algorithm and its velocity counterpart. However, during saturation, when the control effort becomes constrained by one of its limits, the behavior of the foregoing two algorithms is quite different. The velocity type algorithm will move away from its constraints as soon as the absolute value of the error signal on which it is acting decreases. In contrast, a positional type algorithm will not move away from its constraints until the sign of the error signal changes.

Equations 1, 2 and 3 are written to apply derivative action to the error signal. One popular variant of these algorithms is to replace the error signal with the process measurement in the derivative calculation. This change results in smoother transition of the process between setpoint values while not adversely effecting disturbance rejection.

In addition, equations 1, 2 and 3 are written in a form that calculates the derivative contribution directly. Typically, this calculation is implemented in conjunction with a first order filter operating at a time constant of 10% of the derivative time. Equation 4, shown below, illustrates this implementation of the derivative calculation. This modification is made to minimize the effect of process noise on the control signal:

$$\text{Derivative Contribution} = \frac{k_D S}{.1 k_D S + 1} \quad (4)$$

Another common modification of the PID algorithm is external reset. This variation of equation 3 substitutes an external measurement for the control output in the integral equation. This modification is used to prevent wind-up of the integral term resulting from saturation of the inner loop of cascade control strategies.

Prior art industrial PID controllers allow a user to select between the various algorithm forms only by selection of actual hardware. Thus, the hardward utilized determines the forms of algorithms available in a controller. Because of this limitation, it has been desirable to develop a PID controller which produces a multiplicity of algorithm forms not limited by the hardware utilized.

SUMMARY OF THE INVENTION

The present invention solves the problems associated with the prior art and other problems by providing a general implementation of a proportional plus integral plus derivative controller. Such a controller can be any one of the controllers, or variations thereof, discussed in the book *Distributed Control Systems* by Michael P. Lukas, Von-Nostrand Reinhold Co., 1986. Several options are provided by the present invention permitting the user to tailor the invention to a specific problem. An algorithm option allows the selection of a non-interacting type of controller or a classical interacting type of controller. A non-interacting type of controller may be characterized by the property that tuning any of the controller's three modes does not effect the tuning of the remaining modes. In contrast, the classical interacting type of controller exhibits interaction among the tuning parameters, thus closely resembling the behavior of analog controllers.

The algorithm option also selects an external reset controller. This option is based upon the classical interacting type of algorithm and provides a mechanism for controlling integration external to the PID algorithm. External reset provides a mechanism for coordinating the action of controllers used in combinations such as cascade configurations.

DESCRIPTION OF THE PREFERRED EMBODIMENT

Figure 1:
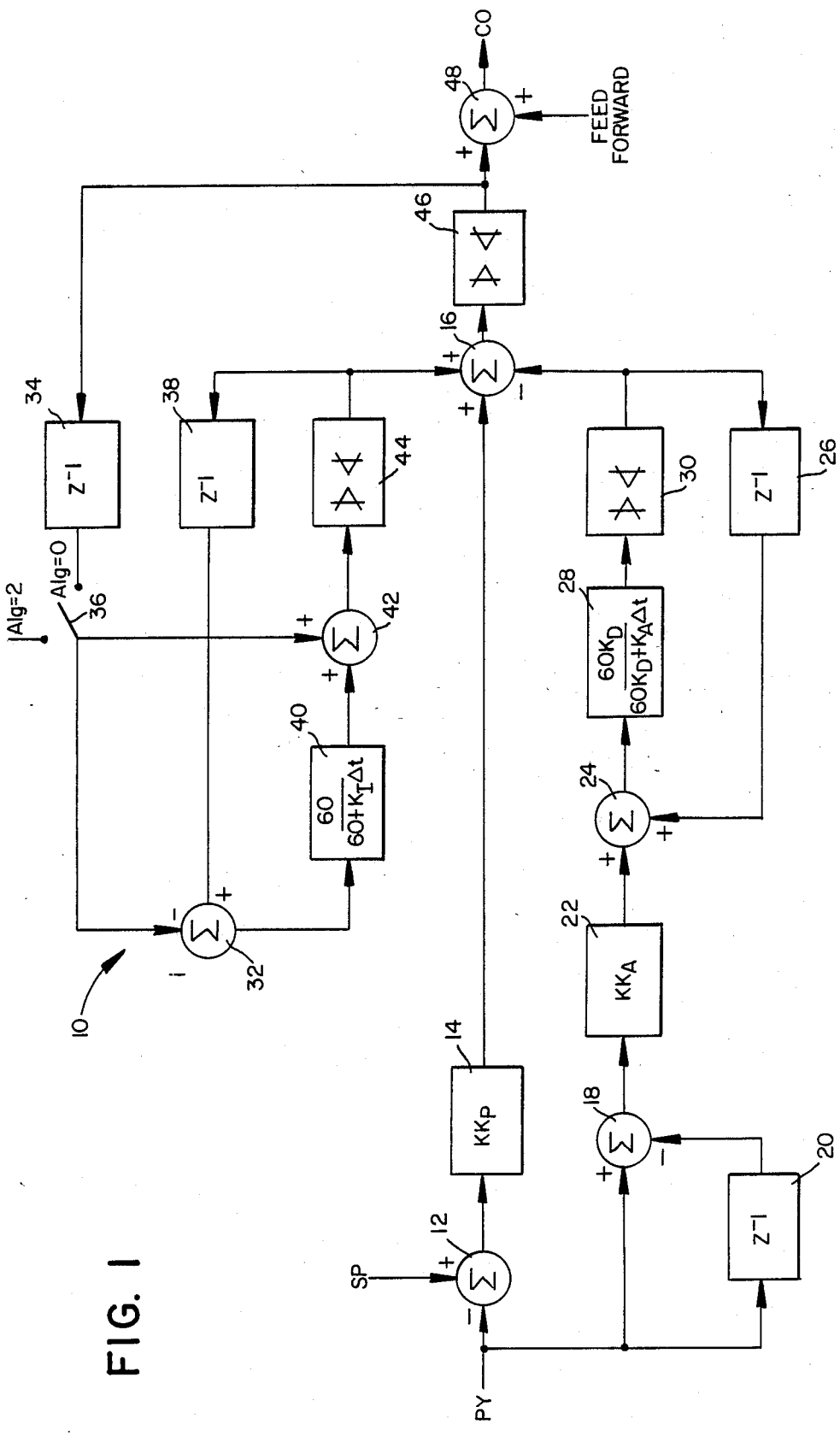
FIG. 1 is a block diagram of a classical interacting type of algorithm.

Referring now to the drawings where the illustrations are for the purpose of describing the preferred embodiment of the present invention and are not intended to limit the invention hereto, FIG. 1 is a block diagram of a classical interacting type of algorithm 10, i.e., the integral term is a function of the proportional term and the derivative term. As such, this diagram is comprised of an upper portion which represents the integral term, a middle portion which represents the proportional term, and a lower portion which represents the derivative term. Referring now to the middle portion, a signal representative of the process variable to be controlled is applied to the negative input of a summer 12 having a setpoint signal applied to its positive input. The output of the summer 12, which represents an error signal, is applied to the input to a proportional multiplier 14 wherein the error is multiplied by the factor kkp. The output of the proportional multiplier 14 is applied to a positive input to a summer 16. The signal representative of the process variable is also applied to the positive input to a summer 18. A signal representative of the previous process variable is supplied by a Z transformation function block 20 to the negative input to the summer 18. The output of the summer 18 is applied to a proportional multiplier 22 which multiplies the incoming signal by the factor $kk_4$. The output of the proportional multiplier 22 is applied to the positive input to a summer 24 whose other positive input is connected to a Z transformation function block 26 which provides a signal representative of the previous derivative term. The output of the summer 24 is applied to a proportional multiplier 28 which represents the factor $60k_D/60k_D + k_4\Delta t$). The output of the proportional multiplier 28 is representative of the derivative term and is applied to a high/low limiter 30 whose output is applied to a negative input to the summer 16.

With respect to the integral term of the algorithm, the previous algorithm is applied to the negative input to a summer 32 via a Z transformation function block 34 and a switch 36. The previous integral term is applied to the positive input to the summer 32 via a Z transformation function block 38. The output of the summer 32 is applied to a proportional multiplier 40 representative of the function $60/(60 + k_I\Delta t)$ whose output is applied to the positive input to a summer 42. The other positive input to the summer 42 is connected to the switch 36. The output of the summer 42 represents the integral term and is applied to a high/low limiter 44 whose output is connected to a positive input to the summer 16. The output of the summer 16 is applied to a high/low limiter 46 whose output is connected to the positive input to a summer 48 whose other positive input receives a feed forward signal. The output of the summer 48 is the classical interacting type of proportional plus integral plus derivative algorithm.

Figure 2:
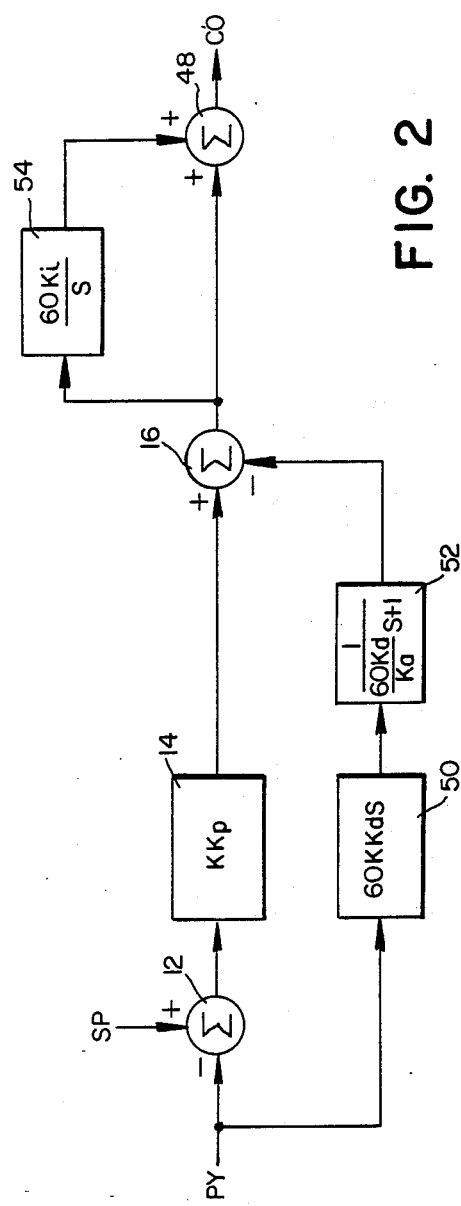
FIG. 2 is a block diagram of the algorithm shown in FIG. 1 and in the Laplace domain.

Referring to FIG. 2, there is illustrated a block diagram of the algorithm shown in FIG. 1 and in the Laplace domain. Those elements which are similar to those shown in FIG. 1 have the same reference numerals and will not be discussed further. In this Figure, the elements which produce the derivative term of FIG. 1 have been replaced by proportional multipliers 50 and 52 representative of the functions $60kk_dS$ and $1/(60k_dS+1)$, respectively. The elements which produce the integral term have been replaced by a proportional multiplier 54 representative of the function $60k_i/S$. The output of the summer 32 is shown as CO which represents the control output.

Figure 3:
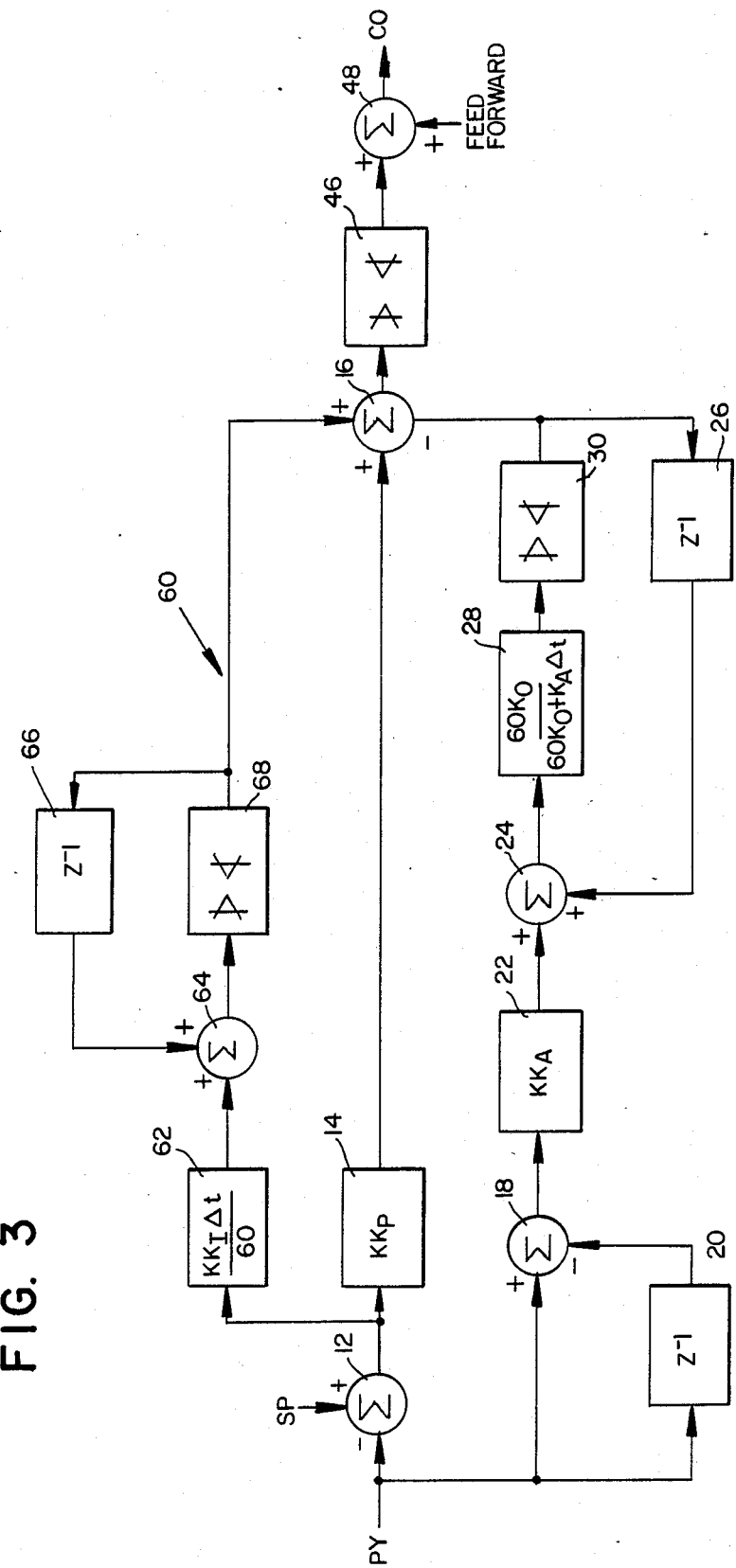
FIG. 3 is a block diagram of a non-interacting type of algorithm.

A block diagram of a non-interacting type of algorithm 60 is shown in FIG. 3. Here again, those elements which are similar to those shown in FIG. 1 have the same reference numerals and will not be discussed further. This Figure differs from FIG. 1 in that the upper portion, which produces the integral term, is comprised of different components. In this Figure, the output of the summer 12, which represents the error signal, is applied to the proportional multiplier 14 and to a proportional multiplier 62, which represents the function $kk_I\alpha t/60$, and whose output is applied to the positive input to a summer 64. The previous integral term is applied to another positive input to the summer 64 via a Z transformation function block 66. The output of the summer 64 is applied to the input to a high/low limiter 68 whose output is connected to the positive input to the summer 16. The output of the summer 16, which represents the proportional plus integral plus derivative algorithm, is applied to the high/low limiter 46 whose output is applied to the summer 48 which produces the control output signal, CO.

Figure 4:
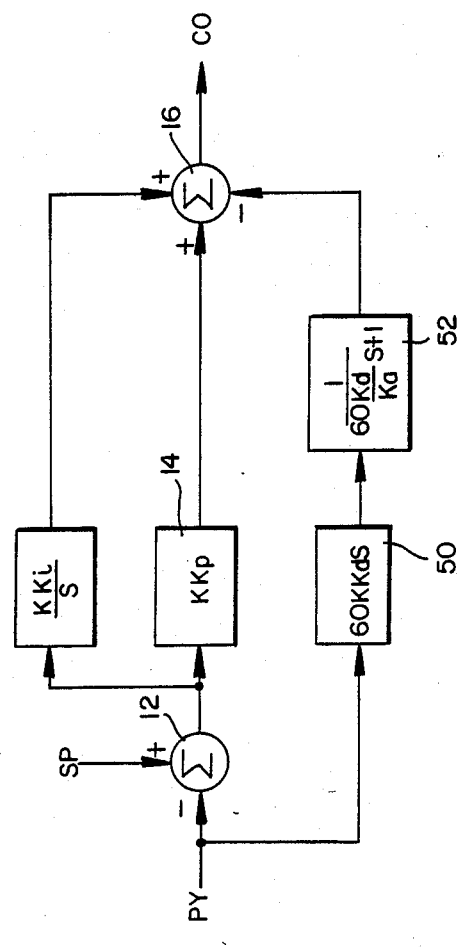
FIG. 4 is a block diagram of the algorithm shown in FIG. 3 and in the Laplace domain.

Referring now to FIG. 4, a block diagram of the algorithm shown in FIG. 3 is represented in the Laplace domain. Here again, those elements which are similar to those in the previous Figures have the same reference numerals and will not be discussed further. This Figure differs from FIG. 2 in its representation of the upper loop, i.e., the integral term of the algorithm. In this case, the output of the summer 12 is applied to both the proportional multiplier 14 and to a proportional multiplier 68 representative of the function $kk_i/S$. The output of the proportional multiplier 68 is applied to a positive input to the summer 16 which produces the CO control signal.

Figure 5:
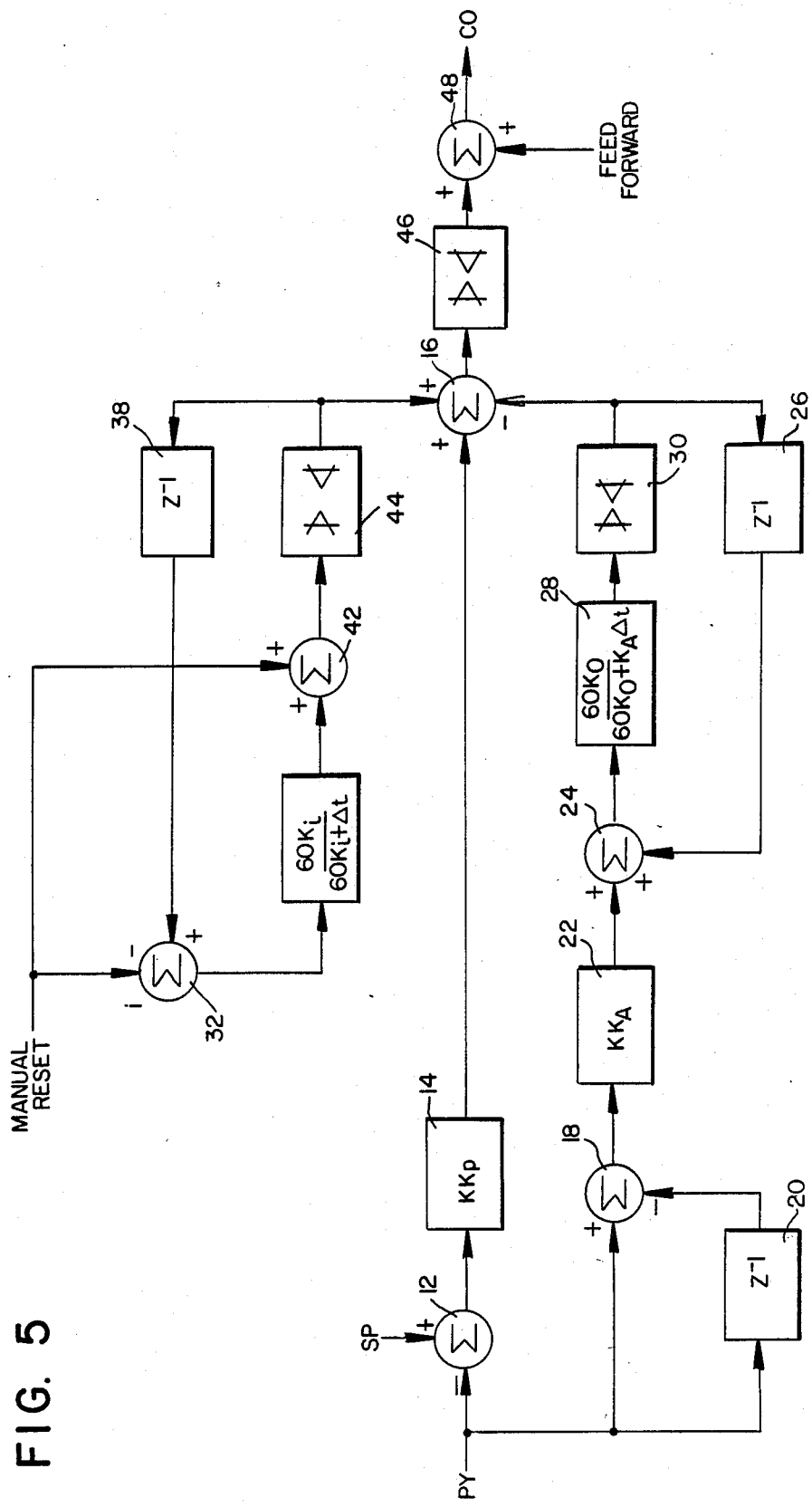
FIG. 5 is a block diagram of the algorithm illustrated in FIG. 1 and in the reset mode of operation.

FIG. 5 is a block diagram of the algorithm 10 shown in FIG. 1 wherein the switch 36 is in the manual reset position. Here again, those elements which are similar to those in FIG. 1 have the same reference numerals and will not be discussed further. In this Figure, by placing the switch 36 in the external reset position, Z transformation function block 34 is bypassed. Thus, this Figure differs from FIG. 1 only with respect to the upper portion thereof, i.e., the portion producing the integral term of the algorithm. The algorithm resulting from switch 36 being in the reset position is used to calculate the output of the feed forward and the algorithm when the algorithm specification is set to 2.

From the foregoing, it is apparent that the type of algorithm produced depends upon the proper selection of same. A selection of 0 causes the PID output to be calculated using a classical interacting algorithm, as shown in FIGS. 1 and 2. This algorithm is interacting in the sense that tuning any one of the proportional, integral or derivative terms changes the effective value of the other terms. In contrast, a selection of 1 causes the PID output to be calculated using a non-interacting control algorithm, as shown in FIGS. 3 and 4. For this type of algorithm, tuning the proportional, integral, or derivative term individually has no effect on the other terms. Furthermore, a selection of 2 causes the PID output to be calculated using the classical interacting algorithm, as shown in FIG. 1, however, for this selection, the integral term is calculated as a function of the external reset signal, as shown in FIG. 5. Lastly, a selection of 3 causes the PID output to be calculated from the proportional and derivative terms only.

Certain modifications and improvements will occur to those skilled in the art upon reading the foregoing. It should be noted that such modifications and improvements have been deleted herein for the sake of conciseness and readability, but are properly within the scope of the following claims.

We claim:

1. Apparatus for producing an interacting proportional, derivative, and integral process control signal from a process variable signal or a proportional, derivative and external reset signal from a process variable signal comprising:
   means for converting the process variable signal into a first signal which is proportional to said process variable signal;
   means for converting the process variable signal into a second signal which is a function of the derivative of said process variable signal;
   means for converting the process variable signal into a third signal which is a function of the integral of said process variable signal;
   means for combining said first, second and third signals to produce said process control signal;
   switch means for removing said third signal from said combining means and replacing third signal with an external reset signal; and
   wherein variation of any one of said first, second and third signals causes a variation in the remainder of said first, second and third signals as per an interacting algorithm.

2. The apparatus as defined in claim 1 wherein said process variable signal converting means that produces said first signal comprises an algorithm in the Laplace domain.

3. The apparatus as defined in claim 2 wherein said algorithm in the Laplace domain is $kk_p$.

4. The apparatus as defined in claim 1 wherein said process variable signal converting means that produces said second signal comprises an algorithm in the Laplace domain.

5. The apparatus of claim 4 wherein said algorithm in the Laplace domain is:

$$60\ kk_d S + \frac{60 K_d^1}{Ka} S + 1$$

6. The apparatus as defined in claim 1 wherein said process variable signal converting means that produces said third signal comprises an algorithm in the Laplace domain.

7. The apparatus as defined in claim 6 wherein said algorithm in the Laplace domain is $60 k_i / S$.

8. The apparatus as defined in claim 6 wherein said algorithm in the Laplace domain is $kk_i / S$.

9. Apparatus for producing a non-interactive proportional, derivative, and integral process control signal from a process variable signal comprising:
   means for converting the process variable signal into a first signal which is proportional to said process variable signal;
   means for converting the process variable signal into a second signal which is a function of the derivative of said process variable signal wherein said process variable signal converting means produces said second signal as an algorithm in the the Laplace domain as follows:

$$60\ kk_d S + \frac{1}{\frac{60 K_d}{Ka} S + 1}$$

means for converting the process variable signal into a third signal which is a function of the integral of said process variable signal;
   means for combining said first, second and third signals to produce said process control signal; and
   wherein variation of any one of said first, second and third signals results in those of said first, second and third signals which have not been varied remaining constant as per a non-interactive PID controls algorithm.

* * * * *